(12) United States Patent
Nakanowatari (10) Patent No.: US 8,499,347 B2
(45) Date of Patent: Jul. 30, 2013

(54) DOCUMENT USE MANAGING SYSTEM, DOCUMENT USE MANAGEMENT METHOD, TEMPORARY USE LICENSE ISSUING APPARATUS, DOCUMENT USING APPARATUS, AND COMPUTER-READABLE MEDIUM

(75) Inventor: Takanori Nakanowatari, Tokyo (JP)

(73) Assignee: Fuji Xerox Co., Ltd., Tokyo (JP)

(*) Notice: Subject to any disclaimer, the term of this patent is extended or adjusted under 35 U.S.C. 154(b) by 691 days.

(21) Appl. No.: 12/784,585

(22) Filed: May 21, 2010

(65) Prior Publication Data

US 2011/0141513 A1 Jun. 16, 2011

(30) Foreign Application Priority Data

Dec. 14, 2009 (JP) ................................. 2009-282440

(51) Int. Cl.
*G06F 21/00* (2006.01)
(52) U.S. Cl.
USPC .................. 726/21; 705/51; 705/54; 709/229
(58) Field of Classification Search
USPC .......................................................... 726/21
See application file for complete search history.

(56) References Cited

U.S. PATENT DOCUMENTS

| | | | |
|---|---|---|---|
| 8,065,498 B2* | 11/2011 | Ito et al. | 711/162 |
| 8,346,926 B1* | 1/2013 | Van Riel et al. | 709/225 |
| 2007/0051798 A1 | 3/2007 | Kawai et al. | |
| 2008/0148067 A1* | 6/2008 | Sitrick et al. | 713/193 |
| 2008/0201552 A1* | 8/2008 | Tokie | 711/204 |

FOREIGN PATENT DOCUMENTS

| | | |
|---|---|---|
| JP | 2007-072639 A | 3/2007 |
| JP | 2007-087020 A | 4/2007 |

* cited by examiner

*Primary Examiner* — Taghi Arani
*Assistant Examiner* — Mahfuzur Rahman
(74) *Attorney, Agent, or Firm* — Sughrue Mion, PLLC (57) ABSTRACT

A temporary use license issuing apparatus includes a communicating unit, an instruction receiving unit, and an issuing unit. The communicating unit communicates with a document use managing apparatus storing pieces of management information prescribing scopes of operation authority of respective users over documents and manages users' operations on documents according to the pieces of management information. The instruction receiving unit receives, from a user, an instruction to issue a temporary use license for a document. The issuing unit issues the temporary use license containing document identification information of the document to which the issuance instruction is directed, and operation authority information indicating a scope of operation authority over the document, the operation authority indicated by the operation authority information being within a scope of the operation authority of the user over the document which is prescribed by the management information.

4 Claims, 7 Drawing Sheets

| DOCUMENT ID | POLICY ID | DOCUMENT NAME |
|---|---|---|
| A-DOC-654 | AABB12345 | PERSONAL HISTORY |
| A-DOC-656 | AABB12345 | PERSONAL HISTORY |
| T-DOC-114 | AADD45678 | TECHNICAL DOCUMENT |
| R-DOC-319 | AZBZ56789 | REPORT |

FIG. 3

| POLICY ID | POLICY NAME | USER ID | OPERATION RIGHTS FOR PROTECTED PAPER DOCUMENT |
|---|---|---|---|
| AABB12345 | IN-HOUSE USE | 10001 | Copy, Fax |
| | | 11101 | Copy, Scan |
| | | 11111 | Copy |
| AADD45678 | TECHNICAL DOCUMENT | 10010 | Copy, Scan, Fax |
| | | 20100 | Copy, Scan |
| | | 20110 | Copy |
| AZBZ56789 | REPORT | 99999 | Copy, Scan |
| | | 55001 | Copy |

FIG. 4

| POLICY ID | TEMPORARY USE | | OPERATION AUTHORITY OF TEMPORARY USE | USE PERIOD | NUMBER OF TIMES OF USE | APPARATUS ID OF DOCUMENT USING APPARATUS |
| --- | --- | --- | --- | --- | --- | --- |
| | ISSUER ID | RECEIVER ID | | | | |
| AABB12345 | 10001 | 10010 | Copy, Fax | THREE DAYS FROM ISSUANCE | 5 | M/C987123 |
| | 10002 | 10020 | Copy | ONE WEEK FROM ISSUANCE | | |
| AADD45678 | 10010 | 10100 | Copy, Scan | TO 2010.1.1 | | |
| | 10030 | 10101 | Copy | | 2 | M/C987123 |
| AZBZ56789 | 10040 | 10025 | Copy, Scan | | 3 | M/C987124 |
| | 10050 | 10200 | Copy | | | M/C987456 |

DOCUMENT USE MANAGING SYSTEM, DOCUMENT USE MANAGEMENT METHOD, TEMPORARY USE LICENSE ISSUING APPARATUS, DOCUMENT USING APPARATUS, AND COMPUTER-READABLE MEDIUM

CROSS-REFERENCE TO RELATED APPLICATIONS

This application is based on and claims priority under 35 USC 119 from Japanese Patent Application No. 2009-282440 filed on Dec. 14, 2009.

BACKGROUND

Technical Field

The present invention relates to a document use managing system, a document use management method, a temporary use license issuing apparatus, a document using apparatus, a document use managing method, a temporary use license issuing method, a document using method and a computer-readable medium.

SUMMARY

A document use managing system includes a document use managing apparatus, a temporary use license issuing apparatus and a document using apparatus. The document use managing apparatus stores pieces of management information which prescribe scopes of operation authority of respective users over documents, and manages users' operations on documents according to the pieces of management information. The temporary use license issuing apparatus includes an instruction receiving unit and an issuing unit. The instruction receiving unit receives, from a first user, an instruction to issue a temporary use license for a first document to which unique document identification information is assigned. The issuing unit issues the temporary use license containing document identification information of the first document to which the issuance instruction is directed, and operation authority information indicating a scope of operation authority over the first document. The operation authority indicated by the operation authority information is within a scope of the operation authority of the first user over the first document which is prescribed by the management information. The document using apparatus includes a document input receiving unit, a reading unit, and an operation execution unit. The document input receiving unit receives input of a second document and the temporary use license from a second user. The reading unit reads document identification information from the second document and reads the document identification information and the operation authority information from the received temporary use license. If the document identification information read from the second document coincides with the document identification information read from the temporary use license, the operation execution unit executes an operation on the second document in accordance with an operation instruction of the second user within the scope of the operation authority indicated by the received operation authority information.

BRIEF DESCRIPTION OF THE DRAWINGS

Exemplary embodiments of the invention will be described in detail based on the accompanying drawings, wherein.

DETAILED DESCRIPTION

Figure 1:
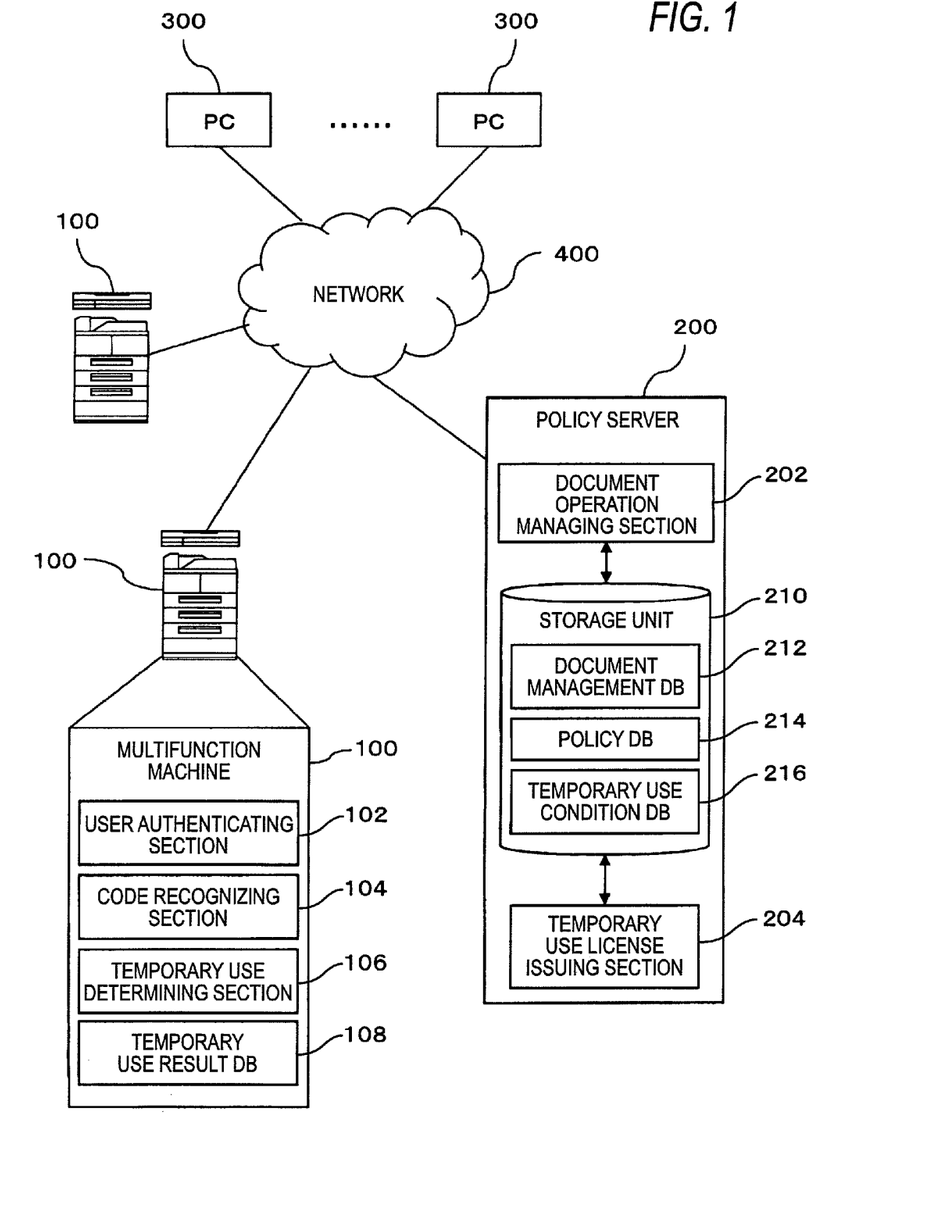
FIG. 1 shows a configuration example of a document managing system according to an exemplary embodiment.

FIG. 1 shows one example of a document managing system according to an exemplary embodiment. This system includes a multifunction machine 100 (an example of a document using apparatus) and a policy server 200 (an example of a temporary use license issuing apparatus). The multifunction machine 100 and the policy server 200 are connected to a network 400 such as a local area network. The system receives processing request(s) from one or more personal computers (PCs) 300 which are operated by respective users.

The multifunction machine 100 may be an apparatus having functions of a network printer, a network scanner, and a copier. The multifunction machine 100 may be equipped with a printing mechanism for performing print processing in response to a print instruction sent from a PC 300, for example, and a scanning mechanism for scanning a document that is set on a document feeder in response to a user operation on a local user interface (UI) of the multifunction machine 100 itself. When receiving a copying instruction, the multifunction machine 100 may scan a set document with the scanning mechanism and print a resulting image with the printing mechanism. In addition to the above mechanisms of the basic functions, the multifunction machine 100 is equipped with a user authenticating section 102 that performs user authentication to accept an operation through the local UI. For example, the user authenticating section 102 may be a device for performing user authentication by reading an IC card storing user authentication information.

The multifunction machine 100 is also equipped with a code recognizing section 104. The code recognizing section 104 reads an image code such as a one-dimensional or two-dimensional bar code from a document image produced by the scanning mechanism and recognizes the information contents represented by the image code.

In the exemplary embodiment, electronic documents which are managed by the policy server 200 are assigned document IDs which are pieces of unique identification information. Each electronic document contains, in addition to document content data, an image code representing its document ID. When the multifunction machine 100 or a printer prints the electronic document, not only the document contents thereof but also the image code representing the document ID thereof is printed on a sheet. In the exemplary embodiment, the policy server 200 issues a temporary use license which represents details of a temporary use right for an electronic document managed by the policy server 200. The temporary use license contains an image code representing the details of the temporary use right such as the document ID of a subject document and a permitted scope of operation authority (i.e., information indicating permitted types of operations). Therefore, when a temporary use license is printed by the multifunction machine 100 or the like, statements for humans regarding the details of the temporary use right and the image code are printed on a sheet. The code recognizing section 104 of the multifunction machine 100 recognizes such an image code.

A temporary use determining section 106 determines, on the basis of contents of a temporary use right which have been recognized by the code recognizing section 104 from a temporary use license, as to whether or not temporary use of a subject document by a user is permitted.

A temporary use result database (DB) 108 may be a database storing a result of processing which is executed according to the use right represented by a temporary use license.

The temporary use determining section 106 and the temporary use result DB 108 will be described later in detail.

The policy server 200 may be a server that controls or manages the security (information protection) electronic documents to be managed. The term "electronic document" may mean electronic data which expresses a document in a given data format. For its control and management, each electronic document is assigned a security policy. The security policy is information which describes what operations each user is permitted for the associated electronic document, and can be called operation authority information, for example. From the opposite point of view, it can be said that the security policy is information indicating as to what restrictions is imposed on each user in operating the electronic document. Therefore, the security policy can also be called operation restriction information. Operations on an electronic document include viewing, editing, printing, electronic copying, fax transmission, etc.

In the specification, the term "user" is not limited to a single user but includes a group having plural users. When a user requests a certain operation on a certain electronic document, the policy server 200 determines as to whether or not the user is permitted to execute the operation on the electronic document by referring to the security policy, which is assigned to the electronic document. The request is accepted only if the user is permitted to do so.

To enable such a control, a document management database (DB) 212 and a policy DB 214 are stored in a storage unit 210 of the policy server 200.

Figure 2:
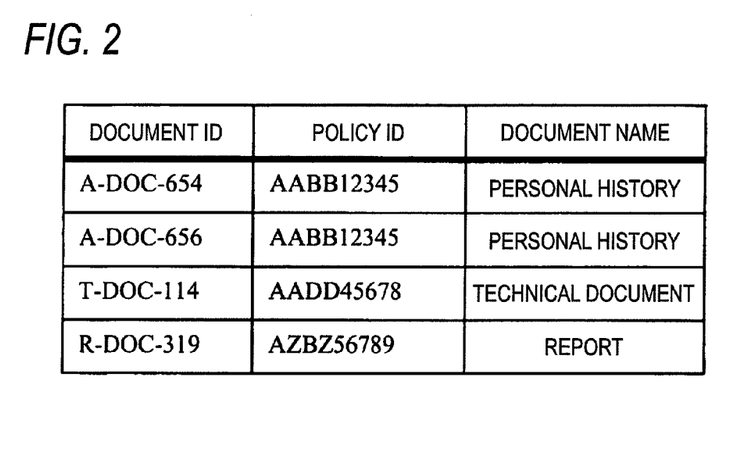
FIG. 2 shows one example of data contents of a document management DB.

The document management DB 212 may be a database for storing information indicating as to what security policies are assigned (to be applied) to respective electronic documents to be managed. FIG. 2 shows one example of data contents of the document management DB 212. In this example, for each electronic document to be managed, the document management DB 212 stores such pieces of information as a document ID which is identification information of the electronic document, a policy ID which is identification information of a security policy to be applied to the electronic document, and a name of the electronic document (document name). Each electronic document itself is registered in a document DB (not shown) so as to be associated with the document ID. The document management DB 212 may be provided in either the policy server 200 or another computer on the network 400. Groups of electronic documents stored in plural respective document DBs existing on the network 400 may be managed by the single policy server 200. A security policy may be assigned to an electronic document by a known method by, for example, a person who creates or manages the electronic document.

Figure 3:
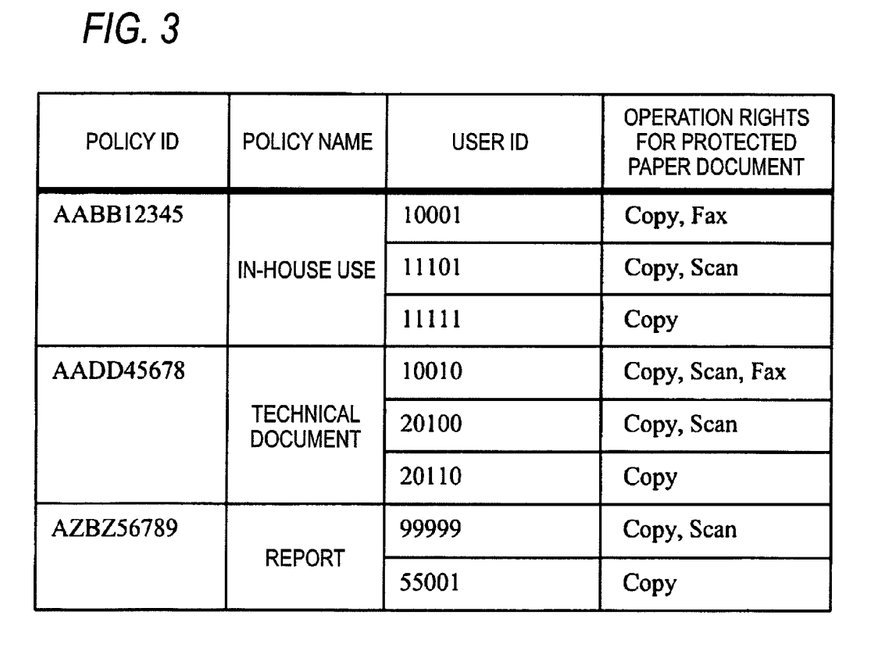
FIG. 3 shows one example of data contents of a policy DB.

The policy DB 214 stores one or more records representing the contents of respective security policies (hereinafter, may be simply referred to as "policies") used in the system. FIG. 3 shows one example of data contents of the policy DB 214. In this example, the record of each policy includes a policy ID which is identification information of the policy and a policy name which is a name of the policy. For each user (or user group) who is permitted to execute certain operations on the electronic document to which the policy is to be applied, information indicating a scope of operation authority the user is given for the electronic document (e.g., a list of permitted types of operation authority) is included in the record of the policy. For example, for the electronic document to which the policy having a policy ID "AABB12345" (shown at the top of the example of FIG. 3) is assigned, the user having a user ID "10001" (or a user who belongs to a group indicated by this ID) has rights of copying and fax transmission. What group each user belongs to is managed by a directory server or a personnel information server (not shown), and the policy managing apparatus 100 refers to information managed by that server, and the policy server 200 refers to information managed by that server.

When a client apparatus such as the multifunction machine 100 or a PC 300 has issued a request for an operation (e.g., viewing, editing, or printing) on an electronic document, a document operation managing section 202 determines as to whether to accept the request by referring to the document management DB 212 and the policy DB 214. This processing may be the same as a process of a related art for determining user operation authority based on a security policy.

For example, when a user attempts to open an electronic document existing in the PC 300 by operating the PC 300, the document ID, which is contained in the electronic document, is sent from the PC 300 to the policy server 200 together with a user ID of the user. In this case, the document operation managing section 202 of the policy server 200 finds the policy ID corresponding to the document ID by referring to the document management DB 212 and acquires information of the contents of the policy having the thus-found policy ID. The document operation managing section 202 generates, on the basis of the contents of the policy, license information indicating as to what operation authority the user having the received user ID is given, and returns it to the PC 300. The PC 300 permits the user an operation within the scope of operation authority indicated by the license information.

Alternatively, when a user instructs a certain operation on an electronic document existing in a PC 300, information indicating a type of the instructed operation may be sent to the policy server 200 together with the document ID and the user ID. In this case, the document operation managing section 202 of the policy server 200 may determine, on the basis of the associated policy stored in the policy DB 214, as to whether or not the user having that user ID is permitted to execute that type of operation on the electronic document having that document ID and returns a determination result to the PC 300. In this case, the PC 300 executes or refuses to perform the operation instructed by the user according to the determination result.

When a PC 300 requests an operation on an electronic document, which is stored in another apparatus (called "apparatus A") on the network 400, the apparatus A which receives the request may inquire of the policy server 200 whether to accept the request. In this case, in response to the inquiry, the document operation managing section 202 determines as to whether to accept the request and returns a determination result to the apparatus A. The apparatus A accepts the request and executes necessary processing or refuses the request according to the determination result.

For example, when a user instructs an operation on a paper document from the multifunction machine 100, the user causes the scanning mechanism of the multifunction machine 100 to read the paper document on which an image code of its document ID is printed. The code recognizing section 104 recognizes the document ID of the paper document by recognizing the image code and sends the policy server 200 the recognized document ID and a user ID which was determined by authentication which was executed by the user authenticating section 102 in advance. In response, as in the case of an inquiry from the PC 300, the document operation managing section 202 of the policy server 200 generates license information indicating as to what operation authority the user having the received user ID is given and returns it to the multifunction machine 100. The multifunction machine 100 permits the user an operation within the scope of operation authority indicated by the license information.

A temporary use condition DB 216 may be a database which stores information indicating sets of temporary use conditions of a temporary use license.

Figure 4:
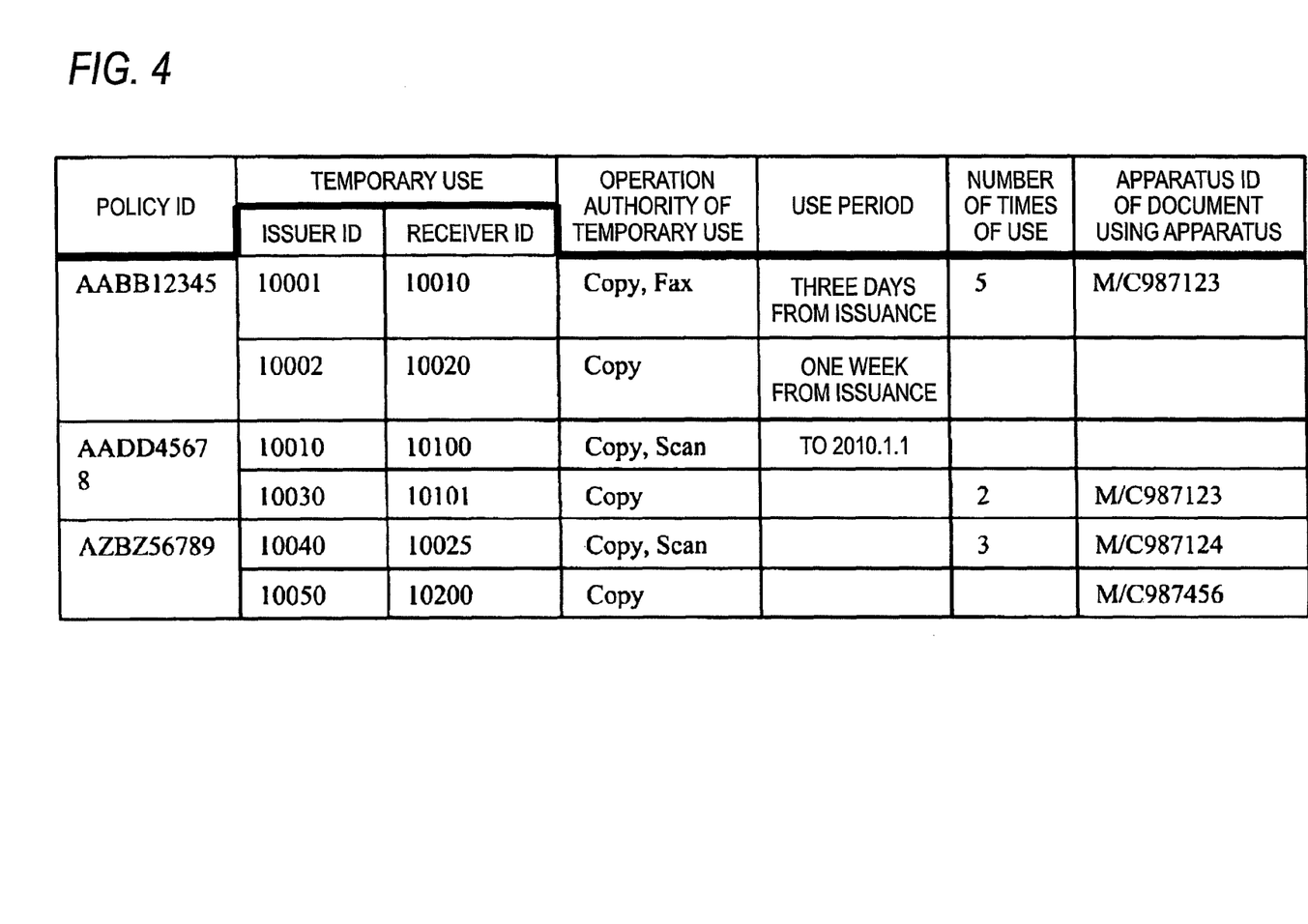
FIG. 4 shows one example of data contents of a temporary use condition DB.

FIG. 4 shows one example of pieces of information which are registered in the temporary use condition DB 216. In this example, a set of temporary use conditions is prescribed for each combination of a policy ID, an issuer ID, and a receiver ID. Each set of temporary use conditions includes such items as a scope of operation authority of temporary use (e.g., a list of types of permitted operation authority), a use period, the number of times of use, and an apparatus ID.

The issuer ID may be an ID of a user who can issue a temporary use license, and the receiver ID may be an ID of a user who can receive a temporary use license.

The use period prescribes a period in which a temporary use license which is issued under the temporary use conditions can be used. For example, the use period may be information which prescribes start date or end date or both of a use period or information indicating how long a temporary use license can be used from its issuance date. The number of times of use may be information indicating how many times (upper limit number) a subject document can be operated under a temporary use license. The apparatus ID may be identification information for unique identification of a document using apparatus (e.g., the multifunction machine 100) which is permitted to use a temporary use license being issued on the basis of the temporary use conditions.

Among the items of the above temporary use conditions, the use period, the number of times of use, and the apparatus ID may be omitted. However, to restrict the use of a temporary use license, for example, at least one of the use period, the number of times of use, and the apparatus ID may be specified in the temporary use conditions. If both of the use period and the number of times of use are specified in the temporary use conditions, a temporary use license can be used less than the specified number of times in the specified use period. In this case, after a lapse of the use period, a control is made so that the temporary use license cannot be used even if the number of times the temporary use license has been actually used is smaller than the specified number. If both of the apparatus ID and the number of times of use are specified in the temporary use conditions, the number of times the document using apparatus having that apparatus ID has solely used a temporary use license is counted, and it is determined as to whether or not the use of the temporary use license is permitted, on the basis of the count and the number of times of use (upper limit number) prescribed in the temporary use conditions.

In the exemplary embodiment, a temporary use license for a document to which a policy having a certain policy ID is to be applied can be issued by only the user having the issuer ID, which is registered in the temporary use condition DB 216 in association with the policy ID. The issuer ID, which can be registered in the temporary use condition DB 216 in association with a policy ID, is restricted to one of the user IDs of the users who are given operation authority in the policy which is registered in the policy DB 214 in association with the policy ID. That is, in the exemplary embodiment, the authority to issue a temporary use license for a document to which a certain policy registered in the policy DB 214 is to be applied can be given to only the users who are given operation authority in the policy.

Among the temporary use conditions, the scope of operation authority of temporary use should be within the scope of operation authority, which is given to the user having the issuer ID in the policy having the associated policy ID. That is, the operation authority of a temporary use license, which can be issued by an issuer, is restricted to within the scope of operation authority (operations) which the issuer himself/herself is permitted. That is, a control is made so that operation authority which the issuer himself/herself is not permitted in a policy cannot be included in a temporary use license.

Among the temporary use conditions, no particular restrictions may be imposed on the use period, the number of times of use, and the apparatus ID. Alternatively, they may be restricted in accordance with certain conditions. In the latter case, for example, a control may be made so that settable upper limits of the use period and the number of times of use and a range of the apparatus ID may be registered in the temporary use condition DB 216 for each issuer ID. And, a control is made so that the use period, the number of times of use, and the apparatus ID are set so as to satisfy those upper limits and range. Where an effective period is set for a policy which is registered in the policy DB 214, a control may be made so that the use period of a temporary use license for a document to which the policy is to be applied is set within the effective period of the policy.

In the exemplary embodiment, the user having the issuer ID has the right to issue a temporary use license to only the user having the receiver ID which corresponds to the combination of the associated policy ID and the issuer ID. No other restrictions may be imposed on the receiver ID. Alternatively, the receiver ID may be restricted to only IDs of users who have a particular relationship with the user having the issuer ID. For example, the particular relationship may be that a user to be given a receiver ID belongs to the same group as the user having the issuer ID. Where a hierarchical relationship such as a post relationship exists between users, being a subordinate of the user having the issuer ID is an example of the particular relationship.

Whereas in the example of FIG. 4 only one receiver ID is registered for each issuer ID, the temporary use condition DB 216 may be configured so that plural receiver IDs are registered for each issuer ID. In the latter case, an issuer may select one receiver of a temporary use license from the users having respective receiver IDs.

For example, a set of temporary use conditions may be registered in the temporary use condition DB 216 either by a user having an issuer ID or a manager of the policy server 200. In the former case, when a user requests the policy server 200 to register a set of temporary use conditions by accessing it, the policy server 200 determines the policies that give operation authority to the user and causes the user to designate one of those policies for which the set of temporary use conditions is to be registered. As a result, among the items of the intended set of temporary use conditions, the issuer ID (i.e., the ID of the user) and the policy ID are determined. Then, the policy server 200 may cause the user (issuer) to specify a receiver, operation authority of temporary use, a use period, the number of times of use, and an apparatus ID.

The policy server 200 executes a control so that the scope of operation authority of temporary use which the issuer can specify falls within the scope of operation authority which the issuer is given in the policy.

Where information indicating a range of license receivers whom the issuer can designate is registered in the policy server 200, the policy server 200 causes the issuer to select one or more receiver IDs within the range indicated by that information.

Likewise, if information that restricts the range of the use period, the number of times of use, or the apparatus ID is registered in the policy server 200, the policy server 200 executes a control so that what is input by the issuer falls within the range indicated by that information.

The policy server 200 may be configured so that a set of temporary use conditions for an indefinite guest can be set by not specifying a receiver ID. In this case, the policy server 200 may set the scope of operation authority, the use period, the number of times of use, etc. of such a set of temporary use conditions to only viewing, only the date of issuance, and once, respectively, which are very narrow in range.

Where the manager registers a set of temporary use conditions in the temporary use condition DB 216, as in the case of registration by an issuer, the policy server 200 may execute a control so that each item falls within a settable range.

Sets of temporary use conditions are registered in the temporary use condition DB 216 in the above-described manner. Such items as the operation authority of temporary use may be set differently for different receiver IDs even in sets of temporary use conditions corresponding to the same issuer ID.

In response to a request from a user for issuing a temporary use license, a temporary use license issuing section 204 controls the issuance of a temporary use license by referring to the temporary use condition DB 216. Details of this control will be described below with reference to FIG. 5.

Figure 5:
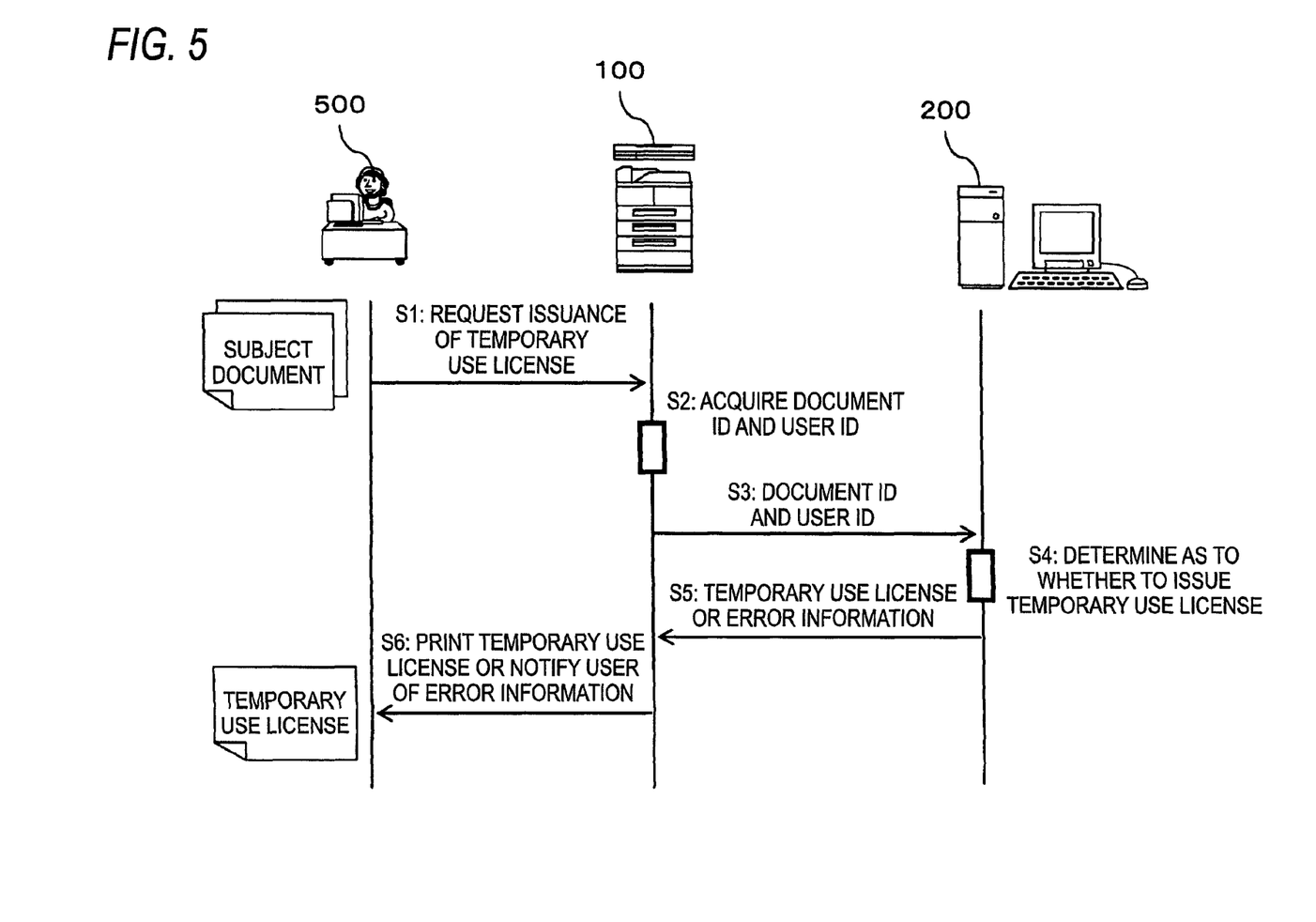
FIG. 5 shows one example of a temporary use license issuing process.

Next, a temporary use license issuing process will be described with reference to FIG. 5. In this example, first, at step S1, a user (issuer) 500 causes the scanner mechanism of the multifunction machine 100 to read a paper document (subject document) to be used temporarily and requests the multifunction machine 100 to issue a temporary use license. At step S2, the code recognizing section 104 recognizes an image code of a document ID from the resulting document image, and the user authenticating section 102 authenticates the user and determines the user ID of the user. At step S3, the multifunction machine 100 sends the policy server 200 an issuance request containing the recognized document ID and the determined user ID. At step S4, upon receipt of the issuance request, the temporary use license issuing section 204 of the policy server 200 determines as to whether to issue a temporary use license, on the basis of the document ID and the user ID which are contained in the issuance request. If a temporary use license should be issued, the temporary use license issuing section 204 generates data of a temporary use license.

In determining as to whether to issue a temporary use license at step S4, first, the temporary use license issuing section 204 acquires, from the document management DB 212, the policy ID corresponding to the document ID contained in the issuance request. Then, the temporary use license issuing section 204 acquires, from the temporary use condition DB 216, a set(s) of temporary use conditions corresponding to the acquired policy ID. If no set of temporary use conditions corresponding to the acquired policy ID is acquired, at step S5 the temporary use license issuing section 204 returns, to the multifunction machine 100, error information indicating that a temporary use license cannot be issued. At step S6, the multifunction machine 100 notifies the user of the error information.

If the set(s) of temporary use conditions corresponding to the policy ID is acquired at step S4, the temporary use license issuing section 204 selects a set of temporary use conditions having the issuer ID which coincides with the user ID contained in the issuance request, from the acquired sets of temporary use conditions. If no set of temporary use conditions having the issuer ID which coincides with the user ID contained in the issuance request is found in the acquired sets of temporary use conditions, at step S5 the temporary use license issuing section 204 returns, to the multifunction machine 100, error information indicating that a temporary use license cannot be issued. At step S6, the multifunction machine 100 notifies the user of the error information.

If only one set of temporary use conditions having the issuer ID, which coincides with the user ID contained in the issuance request, is found in the sets of temporary use conditions acquired at step S4 and if the only one set of temporary use conditions includes only one receiver ID, at step S5 the temporary use license issuing section 204 generates document data representing a temporary use license which describes the contents of the set of temporary use conditions and returns the generated document data to the multifunction machine 100. If the use period of the temporary use conditions is a period starting from the issuance date, the temporary use license issuing section 204 incorporates, into text information and an image code of the temporary use license, a use period that starts at the current date and ends at a date obtained by adding the period and the start date. At step S6, the multifunction machine 100 prints out the received document data of the temporary use license.

Figure 6:
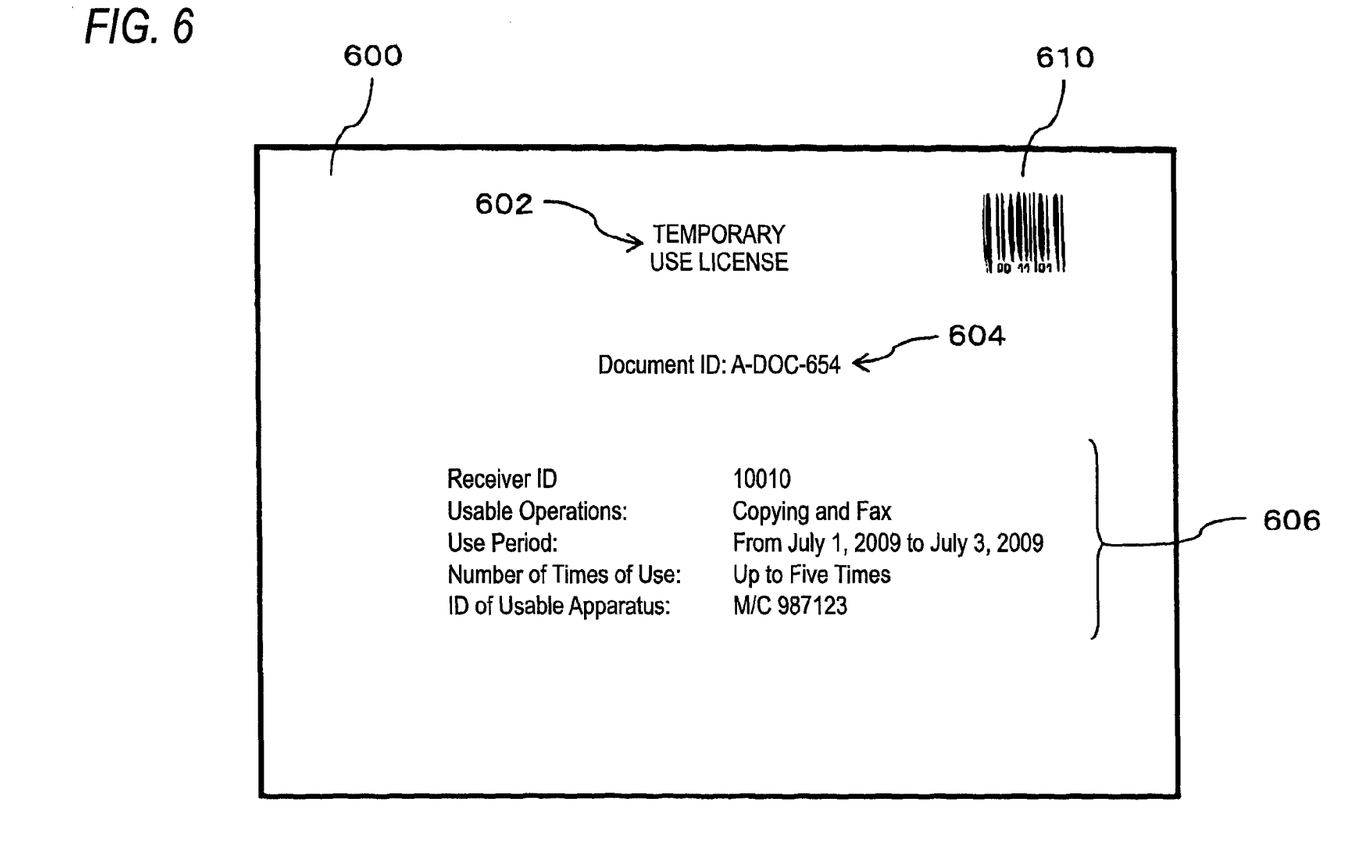
FIG. 6 shows one example of a temporary use license.

FIG. 6 shows one example of the temporary use license 600 thus printed out. In this example, the temporary use license includes pieces of text information 602, 604, and 606 for humans and an image code 610 for machines. The text information 602 indicates that this paper document is a temporary use license. The text information 604 shows a document ID of a subject document which this temporary use license permits to use. The text information 606 shows the temporary use conditions of this temporary use license, that is, a receiver ID, a scope of operation authority, a use period, the number of times of use, and an apparatus ID of a usable apparatus. The image code 610 shows the identification information of this temporary use license itself (license ID), the document ID 604, and the contents of the temporary use conditions 606. Although in this example the image code 610 is a one-dimensional bar code, it may be another type of image code such as a two-dimensional bar code.

The temporary use license issuing section 204 generates temporary use license data containing pieces of the text information 602-604 and the image code 610, executes falsification preventive processing (e.g., adding a digital signature to the data) on the data, and sends the resulting data to the multifunction machine 100.

The temporary use license of FIG. 6 is issued by the temporary use license issuing section 204 on the basis of the temporary use conditions shown in FIG. 4 when on Jul. 1, 2009 a user having the user ID "10001" requested the issuance of a temporary use license for the document to which the policy having the policy ID "AABB12345" is to be applied.

If the sets of temporary use conditions acquired at step S4 include plural sets of temporary use conditions whose issuer IDs coincide with the user ID contained in the issuance request, the temporary use license issuing section 204 informs the multifunction machine 100 of the contents of those plural sets of temporary use conditions. The multifunction machine 100 displays the plural sets of temporary use conditions on a display device and allows the user to select one of them. The temporary use license issuing section 204 issues a temporary use license representing the contents of the selected set of temporary use conditions.

If there is only one set of temporary use conditions whose issuer ID coincides with the user ID contained in the issuance request but it has plural receiver IDs, the temporary use license issuing section 204 sends the contents of those plural sets of temporary use conditions to the multifunction machine 100. The multifunction machine 100 allows the user to select one or more of those receiver IDs. If the user selects plural receiver IDs, the plural receiver IDs are shown on a temporary use license.

In the above example, the user (issuer) requests the issuance of a temporary use license by causing the multifunction machine 100 to read a document to be used temporarily, this is just an example. Instead, for example, the issuance of a temporary use license may be requested in such a manner that the PC 300 accesses the policy server 200 and specifies an ID of a subject document.

Figure 7:
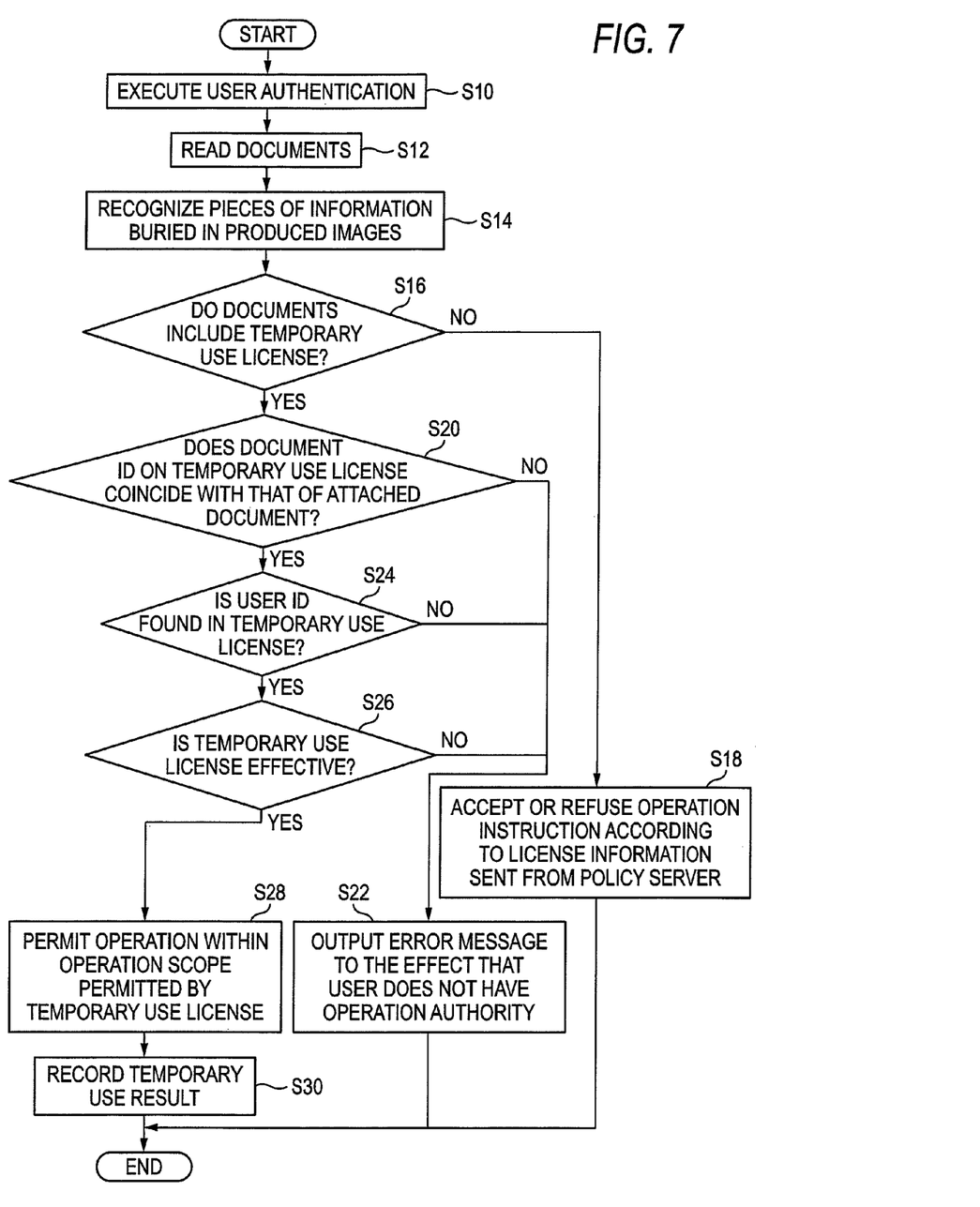
FIG. 7 is a flowchart of a process that is executed by a document using apparatus.

Next, how a document is used under a temporary use license will be described with reference to FIG. 7. In this example, first, at step S10, a user having a temporary use license causes the multifunction machine 100 to authenticate the user by a given method (e.g., through insertion of an ID card or input of a password). The user authenticating section 102 determines a user ID of the user by the authentication processing. At step S12, the user attaches, to the temporary use license, a subject document that the user intends to use under the temporary use license and causes the scanning mechanism to read them. In the following, the document which is read by the scanning mechanism together with the temporary use license will be referred to as an "attached document". At step S14, the code recognizing section 104 recognizes the information contents of the image codes which are contained in the temporary use license and the attached document which have been read by the scanning mechanism. For example, the license ID, the temporary use conditions, etc. are recognized from the image of the temporary use license. The temporary use conditions contain a document ID of a subject document and a scope of operation authority. The temporary use conditions may also include a receiver ID, a use period, the number of times of use, an apparatus ID, etc. The code recognizing section 104 recognizes a document ID from the attached document.

At step S16, the temporary use determining section 106 determines as to whether or not the documents that were read by the scanning mechanism at step S12 include a temporary use license. For example, it is determined that documents include a temporary use license if the pieces of information recognized at step S14 from the images of the respective documents (respective pages) read by the scanning mechanism include a license ID. To this end, it is necessary that the policy server 200 gives each temporary use license a license ID being within a range that is set for license IDs.

If it is determined at step S16 that the read-out documents do not include a temporary use license, at step S18 the temporary use determining section 106 executes an ordinary policy-based document use control. More specifically, for example, the temporary use determining section 106 sends the document ID of the read-out attached document and the user ID to the policy server 200, acquires license information from the policy server 200, and determines, according to the license information, whether to accept or refuse an operation instruction from the user.

If the read-out documents do not include a temporary use license and if the multifunction machine 100 cannot access the policy server 200, the multifunction machine 100 does not accept an operation instruction from the user for the read-out attached document and executes error processing (e.g., displays an error message on the screen).

If the read-out documents include a temporary use license, at step S20 the temporary use determining section 106 determines as to whether or not the document ID of the subject document which was recognized by the code recognizing section 104 at step S14 coincides with the document ID of the attached document which was recognized by the code recognizing section 104 at step S14. If they do not coincide with each other, it means that the temporary use license was not issued for the attached document. In this case, at step S22 the temporary use determining section 106 disables acceptance of an operation instruction from the user and gives the user an error notice to the effect that no operation is permitted.

At step S24, the temporary use determining section 106 determines as to whether or not the user ID which was determined at step S10 coincides with one of the receiver IDs which were recognized from the temporary use license. If a receiver ID indicates a group, the temporary use determining section 106 determines as to whether or not the user ID coincides with any of members of the group indicated by the receiver ID. If the user ID which was determined at step S10 does not coincide with any of the receiver IDs in the temporary use license, at step S22 the temporary use determining section 106 disables acceptance of an operation instruction from the user and gives the user an error notice to the effect that no operation is permitted.

At step S26, the temporary use determining section 106 determines as to whether or not the temporary use license is effective, on the basis of the use period and the number of times of use which were recognized from the temporary use license. The temporary use license is determined effective if the current date and time is within the use period and if the number of times the temporary use license has been used so far is smaller than the number of times of use specified in the temporary use license. In other cases, the temporary use license is determined ineffective. The temporary use determining section 106 makes this determination by acquiring the current date and time from clock incorporated in the multifunction machine 100 and comparing it with the use period recognized from the temporary use license. Furthermore, the temporary use determining section 106 determines the number of times the temporary use license has been used so far from the temporary use records of the temporary use result DB 108, and compares the determined number of times of use with the number of times of use recognized from the temporary use license.

If it is determined at step S26 that the temporary use license is ineffective, at step S22 the temporary use determining section 106 disables acceptance of an operation instruction from the user and gives the user an error notice to the effect that no operation is permitted. At this time, a message to the effect that the temporary use license is expired or the temporary use license is going to be used an excessive number of times may also be displayed.

The determinations of steps S20, S24, and S26 may be made in any order.

If the determination results of all of steps S20, S24, and S26 are affirmative, at step S28 the temporary use determining section 106 instructs a control section of the multifunction machine 100 to accept the operation instruction within the scope of operation authority which was read from the temporary use license. For example, if the scope of operation authority specified in the temporary use license is copying and fax transmission, the control section of the multifunction machine 100 makes, on the user interface, a display to the effect that only copying and fax transmission are usable and executes one of those operations selected by the user.

Alternatively, the multifunction machine 100 may receive an instruction of an operation desired by the user in causing the scanning mechanism to read the temporary use license and the attached document. In this case, the multifunction machine 100 executes the operation indicated by the already-received instruction if the determination results of all of steps S16, S20, S24, and S26 are affirmative, and the operation is determined executable as a result of a comparison between the executable operations of the operation authority which was read from the temporary use license and the operation indicated by the already-received instruction.

Figure 8:
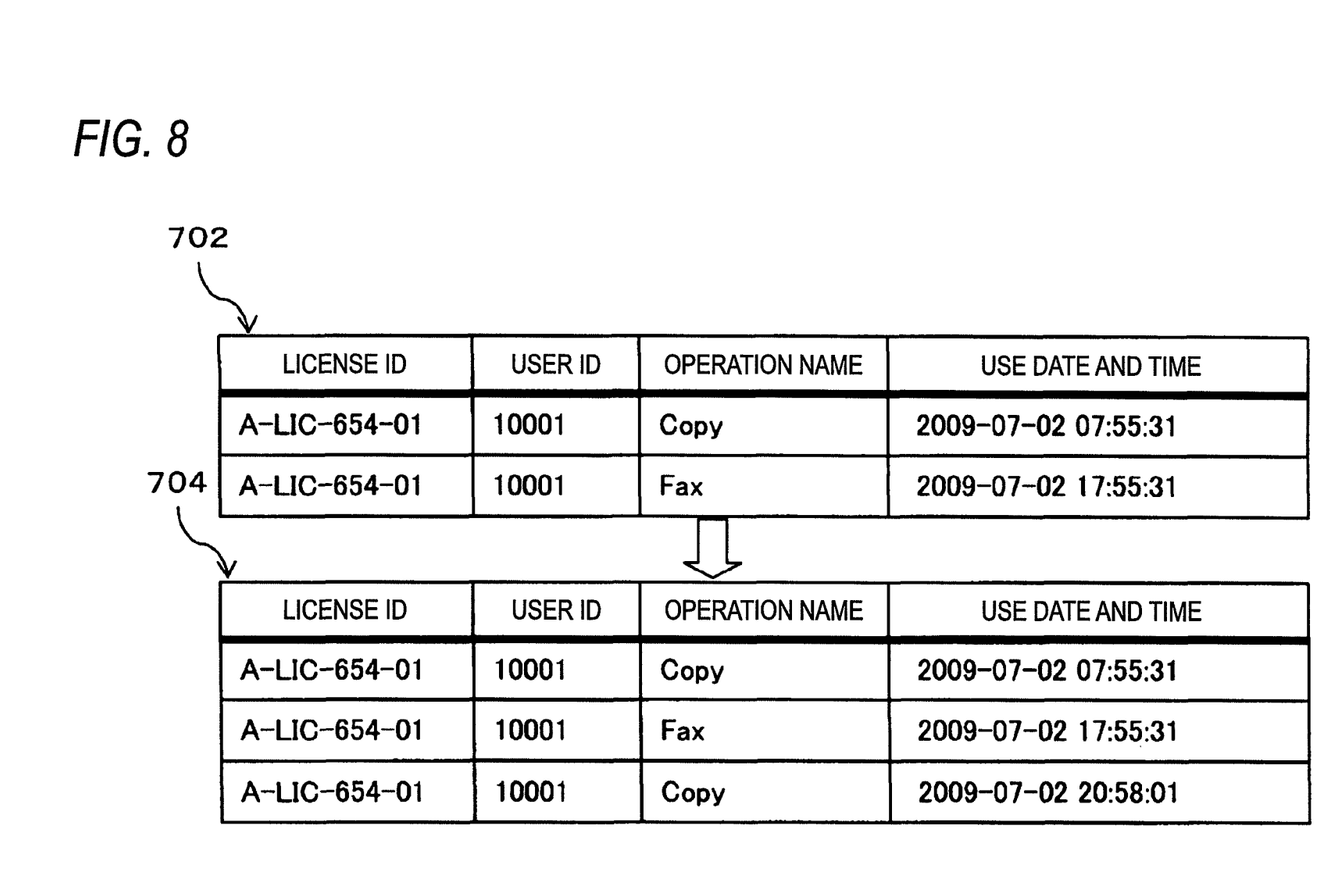
FIG. 8 shows one example of data contents of a temporary use result DB.

When the operation instructed by the user has been executed, the control section of the multifunction machine 100 writes log data of the operation to the temporary use result DB 108. FIG. 8 shows one example of data contents of the temporary use result DB 108. In this example, each log data includes the license ID of a temporary use license recognized at step S14, a user ID determined at step S12, an operation instruction by a user at step S28, and a date and time when the operation was executed (use date and time). The log data may also include other information such as the document ID of the attached document (i.e., the subject of the operation). For example, assuming that a user "10001" executed a copying operation under a temporary use license having a license ID "A-LIC-654-01" (one of the license IDs contained in the temporary use license for a document "A-DOC-654") when the temporary use result DB 108 had data contents 702 shown in FIG. 8. In this case, the temporary use result DB 108 comes to have data contents 704 shown in FIG. 8.

The temporary use determining section 106 searches the temporary use result DB 108 for log records corresponding to the license ID of a read-out temporary use license and determines the number of times of use of the temporary use license from the number of log records found. Alternatively, the count of the number of times of use of the temporary use license may be stored separately in the temporary use result DB 108 so as to be correlated with the license ID, and referred to in determining the number of times of use at step S26. In this case, the count is incremented by one at step S30.

In the above-described system according to the exemplary embodiment, even if the document using apparatus cannot access the policy server 200 for some reason or is in such an environment that no policy server 200 exists, the use of documents can be controlled according to the sets of temporary use conditions managed by the policy server 200 as long as the document using apparatus has the function of performing the above-described control under a temporary use license.

There may occur a case that a first user who has authority to use a document according to a policy that is managed by the policy server 200 wants to request a second user (e.g., a subordinate of the first user) not having use authority under that policy to manipulate the document on behalf of the first user. In such a case, in the mechanism of the exemplary embodiment, the operation is enabled by the first user's issuing a temporary use license to the second user.

For example, the portion in charge of the information processing function of each of the above-described image processing apparatus such as the policy server 200 and the multifunction machine 100 can be implemented by causing a general-purpose computer to run programs representing processes to be executed by the above-described individual function modules. For example, the computer has such a circuit configuration that hardware components such as a microprocessor such as a CPU, memories such as a random access memory (RAM) and a read-only memory (ROM), an HDD (hard disk drive) controller for controlling an HDD, various I/O (input/output) interfaces, and a network interface for performing a control for making a connection to a network such as a local area network are connected to each other via a bus. For example, a disc drive for reading and/or writing on a portable disc recording media such as a CD and a DVD, memory reader/writers for reading and/or writing on a portable nonvolatile recording media of various standards such as a flash memory, and other devices may be connected to the bus via the I/O interfaces. The programs that describe the processing contents of the above-described individual function modules are stored in a fixed storage device such as the HDD over a communication tool such as a network and thereby installed in the computer. The above-described function modules are realized when the programs stored in the fixed storage device are read into the RAM and run by the microprocessor such as a CPU. All or part of the function modules may be a hardware circuit such as a dedicated LSI (large scale integration), an ASIC (application-specific integrated circuit), or an FPGA (field programmable gate array).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document use managing system comprising
 a document use managing apparatus that stores pieces of management information which prescribe scopes of operation authority of respective users over documents and that manages users' operations on documents according to the pieces of management information;
 a temporary use license issuing apparatus; and
 a document using apparatus, wherein
 the temporary use license issuing apparatus includes
 an instruction receiving unit that receives, from a first user, an instruction to issue a temporary use license for a first document to which unique document identification information is assigned, and
 an issuing unit that issues the temporary use license containing
 document identification information of the first document to which the issuance instruction is directed, and
 operation authority information indicating a scope of operation authority over the first document, the operation authority indicated by the operation authority information being within a scope of the operation authority of the first user over the first document which is prescribed by the pieces of management information,
 the document using apparatus includes
 a document input receiving unit that receives input of a second document and the temporary use license from a second user,
 a reading unit that reads document identification information from the second document and reads the document identification information and the operation authority information from the received temporary use license, and an operation execution unit, and if the document identification information read from the second document coincides with the document identification information read from the temporary use license, the operation execution unit executes an operation on the second document in accordance with an operation instruction of the second user within the scope of the operation authority indicated by the received operation authority information;

wherein the temporary use license, which is issued by the issuing unit of the temporary use license issuing apparatus, further contains apparatus identification information for identification of a document using apparatus that is permitted to use the temporary use license, the reading unit of the document using apparatus further reads the apparatus identification information from the temporary use license, and if the apparatus identification information read by the reading unit is different from apparatus identification information of the document using apparatus, the operation execution unit of the document using apparatus does not execute the operation in accordance with the operation instruction of the second user.

2. The document use managing system according to claim 1, wherein the document using apparatus further includes a storage that stores use information indicating the number of times the temporary use license is used, the temporary use license, which is issued by the issuing unit of the temporary use license issuing apparatus, further contains upper limit information indicating an upper limit of the number of times the temporary use license is used;

the reading unit of the document using apparatus further reads the upper limit information from the temporary use license; and if the number of times the temporary use license is used indicated by the use information stored in the storage is smaller than the upper limit number of times of use indicated by the upper limit information read by the reading unit, the operation execution unit of the document using apparatus executes the operation, in accordance with the operation instruction of the second user, on the second document within the scope of the operation authority indicated by the operation authority information and updates the use information stored in the storage so that the use information indicates a number incremented by one.

3. The document use managing system according to claim 1, wherein the temporary use license, which is issued by the issuing unit of the temporary use license issuing apparatus, further contains use period information indicating a usable period of the temporary use license, the reading unit of the document using apparatus further reads the use period information from the temporary use license, and if a current date and time is within the use period read by the reading unit, the operation execution unit of the document using apparatus executes the operation, in accordance with the operation instruction of the second user, on the second document within the scope of the operation authority indicated by the operation authority information.

4. A document use management method wherein comprising the following computer implemented steps:

using pieces of management information that prescribes scopes of operation authority of respective users over documents, managing operations of the respective users on documents according to the pieces of management information, receiving, from a first user, an instruction to issue a temporary use license for a first document to which unique document identification information is assigned, and issuing the temporary use license containing document identification information of the first document to which the issuance instruction is directed, and operation authority information indicating a scope of operation authority over the first document, the operation authority indicated by the operation authority information being within a scope of the operation authority of the first user over the first document which is prescribed by the pieces of management information, receiving input of a second document and the temporary use license from a second user, reading document identification information from the second document;

reading the document identification information and the operation authority information from the received temporary use license, and if the document identification information read from the second document coincides with the document identification information read from the temporary use license, executing an operation on the second document in accordance with an operation instruction of the second user within the scope of the operation authority indicated by the received operation authority information;

wherein the temporary use license, which is issued by an issuing unit of a temporary use license issuing apparatus, further contains apparatus identification information for identification of a document using apparatus that is permitted to use the temporary use license, a reading unit of the document using apparatus further reads the apparatus identification information from the temporary use license, and if the apparatus identification information read by the reading unit is different from apparatus identification information of the document using apparatus, an operation execution unit of the document using apparatus does not execute operation in accordance with the operation instruction of the second user.

* * * * *